US012590531B2

(12) United States Patent
Cole et al.

(10) Patent No.: US 12,590,531 B2
(45) Date of Patent: Mar. 31, 2026

(54) TENSION MONITOR

(71) Applicant: The Charles Machine Works, Inc., Perry, OK (US)

(72) Inventors: Scott B. Cole, Edmond, OK (US); Klayton Day Jones, Perry, OK (US); Sydni Noell Schneberger, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 18/792,722

(22) Filed: Aug. 2, 2024

(65) Prior Publication Data

US 2025/0052145 A1 Feb. 13, 2025

Related U.S. Application Data

(60) Provisional application No. 63/517,780, filed on Aug. 4, 2023.

(51) Int. Cl.
| | |
|---|---|
| *E21B 47/013* | (2012.01) |
| *E21B 47/13* | (2012.01) |
| *G01L 1/22* | (2006.01) |
| *G01L 5/10* | (2020.01) |

(52) U.S. Cl.
CPC ............ *E21B 47/013* (2020.05); *E21B 47/13* (2020.05); *G01L 1/22* (2013.01); *G01L 5/10* (2013.01)

(58) Field of Classification Search
CPC ......... E21B 47/013; E21B 47/13; G01L 1/22; G01L 5/10
See application file for complete search history.

(56) References Cited

U.S. PATENT DOCUMENTS

| | | | | |
|---|---|---|---|---|
| 4,461,459 | A | 7/1984 | Conti | |
| 5,961,252 | A * | 10/1999 | Mercer | E21B 47/13 |
| | | | | 405/175 |
| 7,578,201 | B2 | 8/2009 | Chau et al. | |
| 11,319,797 | B2 | 5/2022 | Morse et al. | |
| 2020/0370417 | A1 * | 11/2020 | Morse | E21B 47/06 |
| 2021/0148222 | A1 * | 5/2021 | Dwyer | H04B 1/1027 |
| 2021/0381314 | A1 * | 12/2021 | Peters | E21B 7/067 |
| 2022/0316325 | A1 * | 10/2022 | Jin | E21B 7/267 |
| 2023/0332488 | A1 | 10/2023 | Jones et al. | |

* cited by examiner

*Primary Examiner* — Caroline N Butcher
(74) *Attorney, Agent, or Firm* — Tomlinson McKinstry, P.C.

(57) ABSTRACT

A tension link for use in downhole operations. The tension link has a link body connecting two features, such as a backreamer and product pipe, which are towed through a borehole. The tension link has electronics which can monitor the tension in the link body. The electronics may include a Bluetooth radio or similar device, which uses a power source to send a low power signal including the tension data to a beacon, which is located in a separate cavity of the tension link. The beacon encodes received information about tension onto a stronger electromagnetic field. This electromagnetic field may, in turn, be used to power the electronics. No direct link between the electronics and the beacon exists, and the beacon may be used in other downhole operations other than tension monitoring, such as directional drilling. The electromagnetic field signal is detected at a receiving antenna at an uphole location.

11 Claims, 16 Drawing Sheets

*"If Energy Harvesting

TENSION MONITOR

BACKGROUND

With reference to FIG. 1, a horizontal directional drilling system 10 is shown. The system 10 is used to create a borehole 12 underground. The borehole 12 provides space for underground infrastructure, such as utility lines, to be installed and is created using a downhole tool 14 carrying a drill bit 16. The downhole tool 14 is advanced beneath a ground surface 18 using a drill string 20. The drill string 20 is made up of a plurality of hollow pipe sections 22 joined end-to-end in torque-transmitting engagement. A drill rig 24 supported on the ground surface 18, and operated by a rig operator, grips a first end 26 of the drill string 20 while the opposed second end 28 is attached to the downhole tool 14. During operation, thrust and rotational forces are transmitted from the drill rig 24 to the drill bit 16 by the drill string 20.

Continuing with FIGS. 1 and 6, the downhole tool 14 houses a beacon 46. The beacon 46 comprises a transmitting antenna 82 installed within a tubular or beacon housing 84, as shown in FIG. 6. Then transmitting antenna 82 is configured to emit a magnetic dipole signal or "beacon signal" 44 to an above-ground tracker 32. The above-ground tracker 32, operated by a tracker operator 34, is configured to detect and analyze the beacon signal 44 in order to determine the downhole position of the beacon 46. The beacon signal 44 includes information about the beacon 46 as well as the downhole conditions, such as the downhole temperature and fluid pressure. One embodiment of a an above-ground tracker 32 and its methods of use are described in U.S. Pat. No. 7,786,731, issued to Cole et al., the entire contents of which are incorporated herein by reference.

While the above system described above is with respect to a drill bit 16, it should be understood that a backreaming operation may follow the drilling of a pilot bore. In a backreaming operation, the pilot drill string is pulled back while a backreamer is pulled towards the drilling machine, enlarging the borehole. Often, a product pipe will be pulled into the enlarged borehole behind the backreamer. In these operations beacons may also be used to track the position of the backreamer.

In such backreaming operations, or in subsequent product pipe towing operations, a tension monitor may be used to ensure that forces on the product pipe are not extreme. A tension monitor produces an electrical signal indicative of the tension placed along the main axis of the link by the pulling force. Excess tension may indicate that damage to the pipe being installed is becoming likely, and remedial steps may be taken to mitigate such damage. One such tension monitor in the prior art is U.S. Pat. No. 5,961,252 issued to Mercer, et al., the contents of which are incorporated herein by reference.

Information regarding the underground environment experienced by the downhole tool 14, whether in a pilot bore or in a backreaming operation, is important as more infrastructure continues to be installed underground. In order to acquire sufficient information about the underground environment, a number of different sensors may be installed within the downhole tool 14.

If one or more sensors are installed within the downhole tool 14 and outside of the beacon housing 84, multiple specialized power sources are often required to power each such sensor and transmit the information to a processor up-hole. For example, a tension link and beacon 46 may each require their own power source and each generate their own signal. In addition, operators often change their beacon 46 to accommodate new up-hole hardware or different drilling needs. When other sensors, such as a tension link, are integral with such beacons, it increases the complexity and cost, and requires the purchase of multiple complex, high-powered beacons for different jobs associated with utility installation. There is a need in the art for a way to provide tension links that are configured to work with a generic beacon, allowing the tension links to operate at low power with limited reliance on a specified beacon for its operation.

SUMMARY

The present invention is directed to a downhole tool. The downhole tool comprises a housing, a tension monitor, and a beacon. The tension monitor is disposed within the housing and comprises a link, a tension monitoring system, a power source, and a first transmitter. The link extends from a first end to a second end, each of the first and second end having a connection point. The tension monitoring sensor is disposed proximate the link. The tension monitoring sensor is configured to generate a tension signal indicative of a tension within the link. The first transmitter is connected to the power source and configured to send the tension signal. The beacon is disposed within the housing and comprises a receiver and a second transmitter. The receiver is configured to receive the tension signal and generate tension data. The second transmitter is configured to transmit a beacon signal to an uphole location. The tension data is encoded on the beacon signal.

In another aspect, the invention is directed to a downhole tool. The downhole tool comprises a housing, a tension link and a beacon. The housing has a first cavity offset from a centerline of the housing, and a second cavity extending longitudinally through the housing along a centerline of the housing. Disposed within the second cavity is a tension link. The tension link comprises a tension sensor configured to detect tension data, a power source, and a first transmitter. The first transmitter is powered by the power source and configured to transmit the tension data. The downhole tool also includes a beacon disposed within the first cavity, the beacon comprises a receiver configured to receive the tension data from the first transmitter and a second transmitter configured to emit a magnetic field signal. The tension data is encoded on the magnetic field signal.

In another aspect, the invention is directed to a kit. The kit comprises a housing, which includes a first cavity offset from the centerline of the housing and opening at the outer periphery of the housing, and a second cavity extending longitudinally through the housing along the centerline. The first cavity and the second cavity do not intersect. The housing further includes a lid covering the first cavity.

Disposed within the second cavity is a tension link that comprises a tension sensor configured to detect tension data, a power source, and a first transmitter powered by the power source and configured to transmit the tension data. The first cavity is configured to house a beacon antenna.

DETAILED DESCRIPTION

Figure 12:
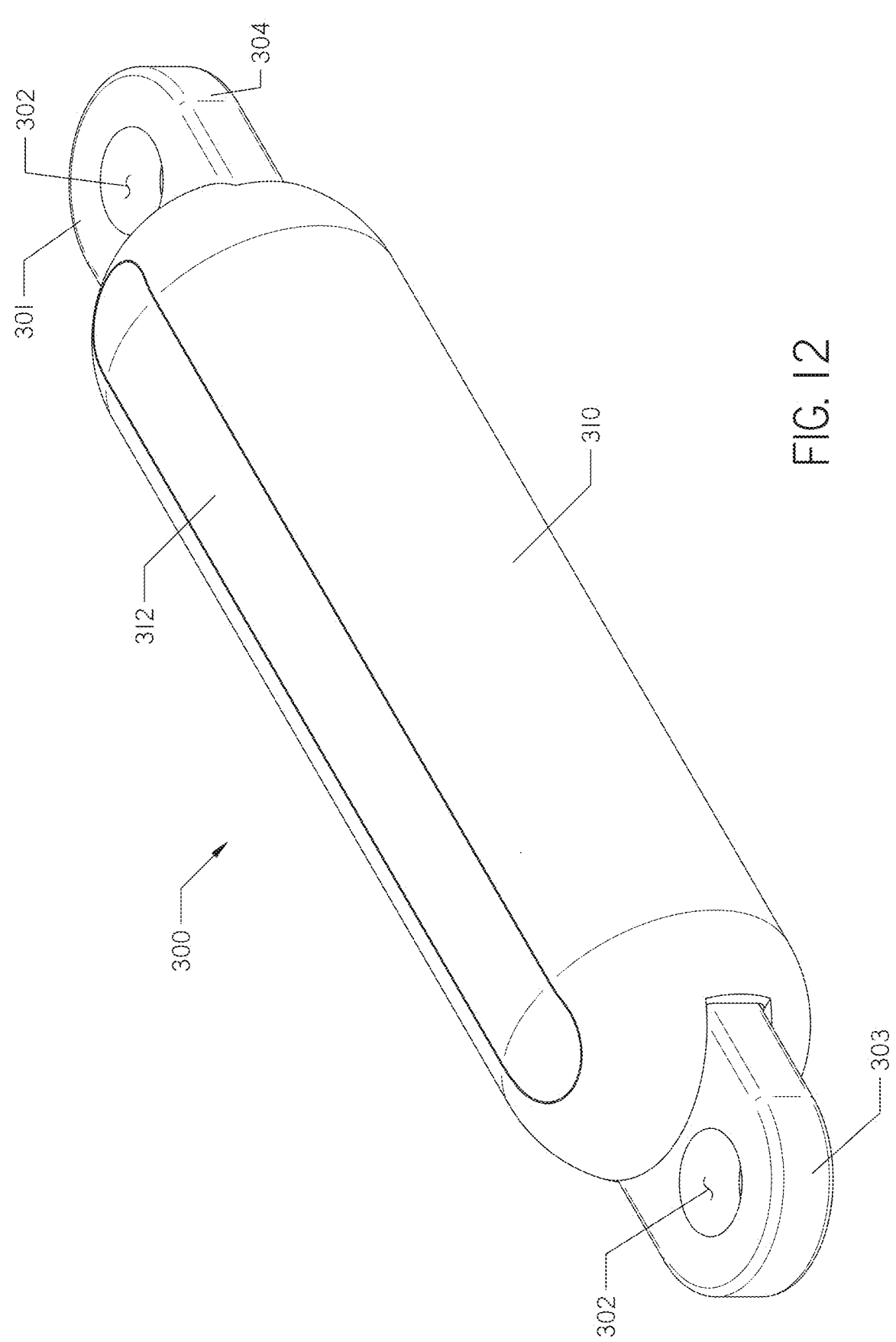
FIG. 12 is a perspective view of a tension link for use in a backreaming operation. The link is encased in a cylindrical housing which contains a beacon and other electronics, including an energy harvesting system.
Figure 13:
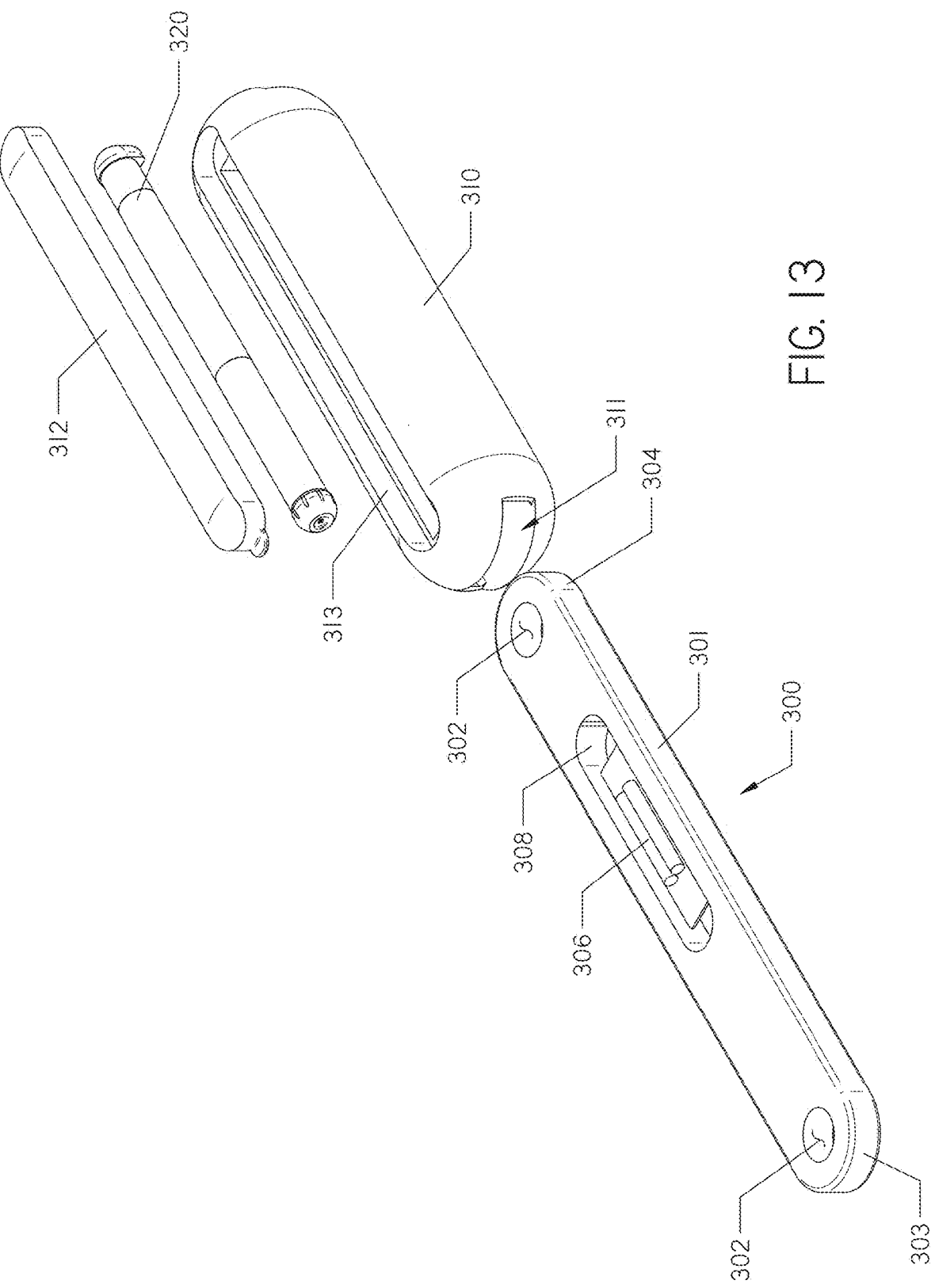
FIG. 13 is an exploded view of the tension link of FIG. 12, with the link exposed such that the energy harvesting apparatus is visible in a cavity thereof. A beacon is also shown.
Figure 14:
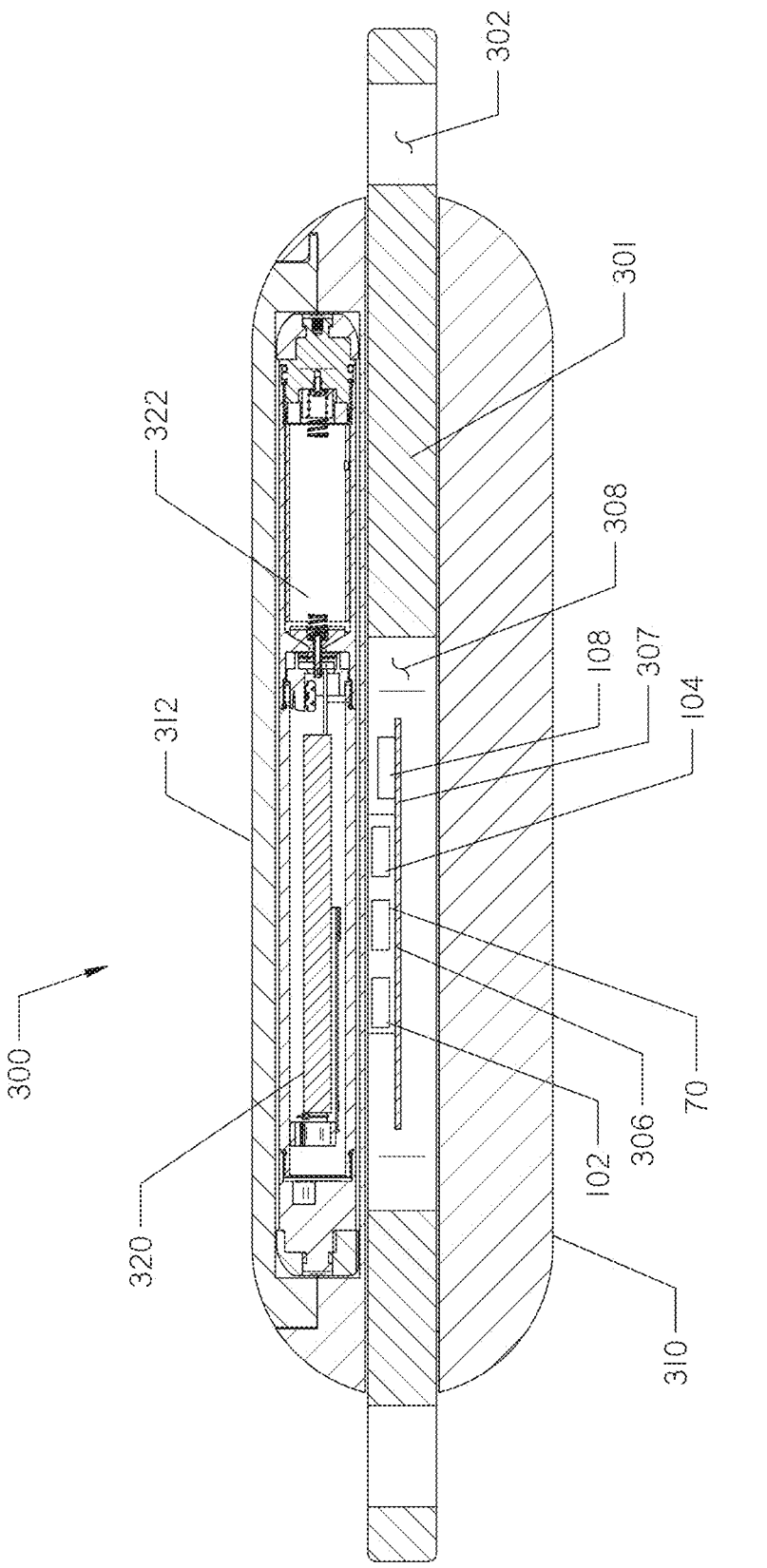
FIG. 14 is a sectional view of the tension link of FIG. 12.

With reference to FIGS. 12-14, a novel tension link 300 is disclosed. Typically, a tension link 300 is disposed between a backreamer and the product pipe, which is being towed behind the backreamer for placement within a bore. The tension link 300 comprises a link body 301 disposed within a central, longitudinal cavity 311 within an enclosure of housing 310, and produces an electrical signal indicative of the tension placed along the main axis of the link body 301 by the pulling force. Excess tension may indicate that damage to the pipe being installed is becoming likely, and remedial steps may be taken to mitigate such damage.

In general, the tension link 300 operates by providing an opening 302 on each of its first end 303 and second end 304 which allows connection to a shackle or other connector. As a pulling force is exerted on the tension link 300, strain on the link body 301 is detected by internal electronics 306. The internal electronics 306 measure the tension and provide a signal indicative of the tension provided.

Figure 16:
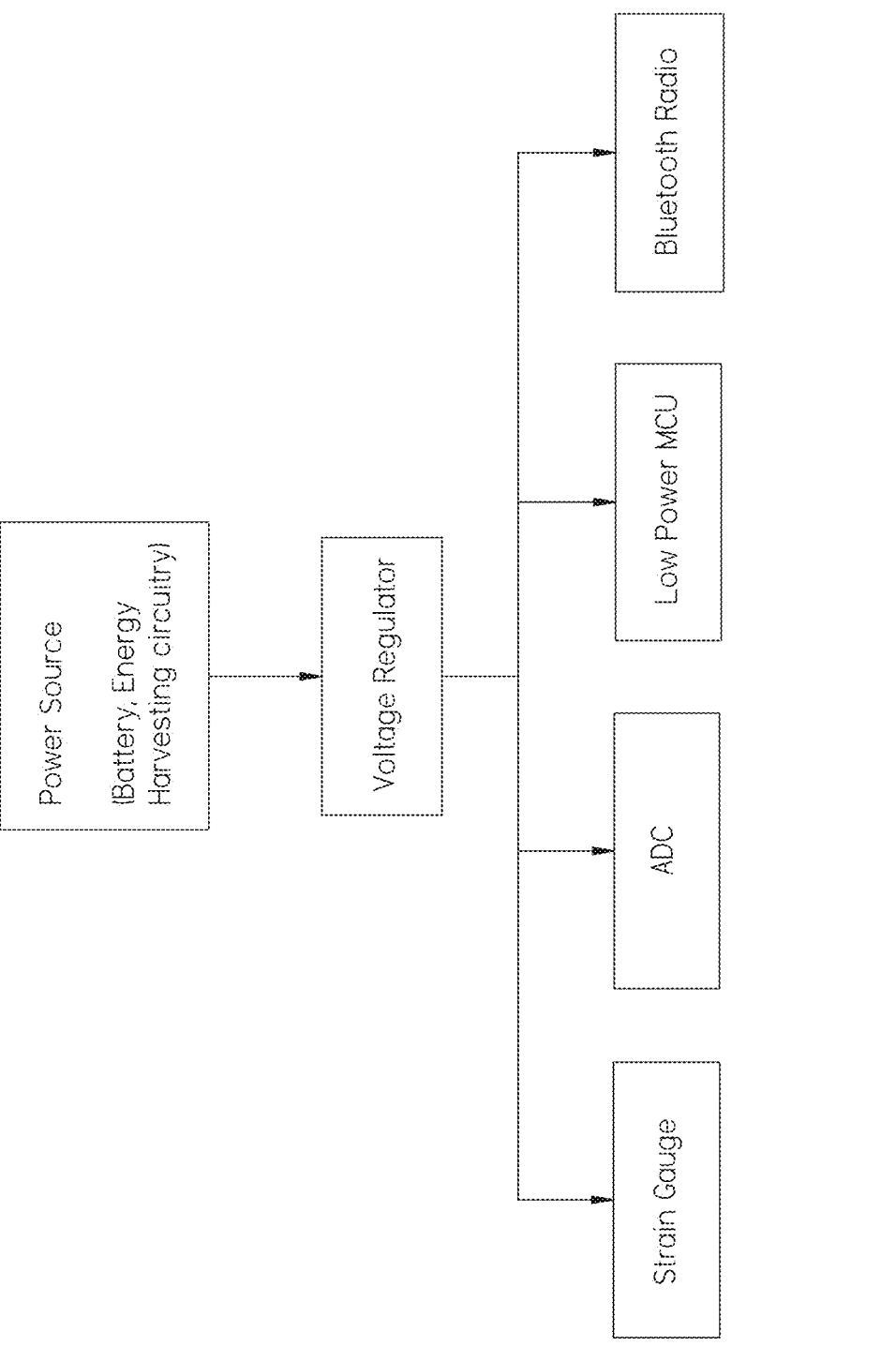
FIG. 16 is a schematic of the electronics within the tension monitor. Potential electronics include a strain gauge for detecting tension in a link, an analog to digital converter, microcontroller, and Bluetooth radio.

Typically, as depicted in FIG. 16, electronics 306 for a tension link 300 include a strain gauge-a sensor that detects small variations in the tension link 300 due to stretching or compression, sometimes on the level of microns. Changes in current within the strain gauge indicate the force placed on the tension link 300 between the first end 303 and the second end 304.

The internal electronics 306 are mounted on a circuit board 307 or other mounting structure, and enclosed in a cutout 308 formed in the link body 301. The internal electronics may include energy harvesting antennas, such as antennas 102 and 104. The energy harvesting antenna may be similar to antennas 102 and 104 shown in FIGS. 8-9, or antennas 202 and 204 from FIG. 10, as described herein. The internal electronics 306 may further comprise one or more supercapacitors 108, power supplies, such as internal batteries, tension link measuring electronics, a low-power microcontroller, required analog-digital convertors to convert the reading of the strain gauge to a digital tension signal, and a Bluetooth radio 70 to send the tension signal to a nearby beacon 320.

The cylindrical enclosure 310 is provided to surround a majority of the tension link 300, encasing the electronics 306 and an enclosure for a separate HDD transmitting beacon 320. The enclosure 310 may be made of plastic or a suitably durable and electromagnetically neutral material.

The HDD transmitting beacon 320 is within the enclosure 310 in a cavity 313 and protected by a lid 312. The cavity 313 is offset from a centerline of the tension link 300 and does not intersect cavity 311, isolating the beacon 320 from the link body 301. This beacon 320 may be similar or identical to that of beacon 46 of FIGS. 7-11. The beacon 320 is typically powered by a larger beacon battery 322. The beacon 320 transmits a signal to an uphole tracker 32 or a drilling machine 24. Preferably, the beacon 320 is the same beacon used in other aspects of directional drilling, such as the drilling of the pilot bore, and the tension link 300 is capable of use with many types of beacon.

In order to allow the tension link 300 to work with multiple types of beacon transmitters 320, there is no direct electrical connection between the beacon transmitter 320 and the electronics package 306. This provides an advantage over tension monitors currently available, which operate as a dedicated package, including an integral tension monitor and beacon transmitter.

With no such electrical connection, the electronics 306 may need to operate at a low power setting, as the beacon battery 322 typically provides a high-capacity power source in a tension link. However, because the beacon 320 is in a pocket within the housing 310, a low-power Bluetooth signal is capable of transmitting from the electronics 306 to a receiver disposed at the beacon 320. In order to accomplish this, the microcontroller may configure the Bluetooth radio 70 to send intermittent, low power signals indicative of measured tension to the beacon 320. For example, the signals may be sent once a second, or once every ten seconds, or every thirty seconds. Alternatively, the signal may be continuous, but low power.

The beacon receiver may be configured to "listen" for signals such as the Bluetooth signal carrying the data indicative of measured tension. The beacon transmitter 320, in turn, emits an electromagnetic signal which encodes information for detection by the above-ground tracker 32. Because the Bluetooth radio 70 need only transmit its tension signal the short, in-hole distance between the internal electronics 306 and the beacon 320, the power requirements of the electronics 306 are low. The signal is then "repeated" by the higher power beacon transmitter 320, powered by beacon battery 322.

As a result, the internal electronics 306 may be powered by a small battery or other power source, or may generate power from energy harvesting antennas.

Should energy harvesting antennas be used, the cutout 308 will provide the energy harvesting antennas 102, 202 with an optimal position to receive energy from the transmitter's antenna 320. One embodiment of such a harvesting antenna system is disclosed below, and disclosed in U.S. Pat. Pub. No. 2023-0332488, authored by Jones, et al., the contents of which are incorporated herein by reference. As disclosed herein, the harvested energy charges the supercapacitor 108.

When the supercapacitors 108 are sufficiently charged, the tension will be read by the microcontroller through the measuring electronics 306 and communicated to the beacon transmitter 320 through the Bluetooth radio 70. Once the data is received by the beacon transmitter 320, the beacon will then transmit the data by encoding the data into the signal, where it is received by the above ground tracker 32 (FIG. 1) for further use. Thus, the field used to generate the power for measuring the tension in the tension link 300 is encoded with data including the tension in the tension link 300.

The disclosed tension monitoring system does not require standalone transmitting circuitry, unlike current units. The unit also does not require a power source, saving money and waste—although if desired, the system could be designed with a standalone power source, allowing the harvesting antennas to charge batteries, as opposed to the supercapacitors.

Figure 1:
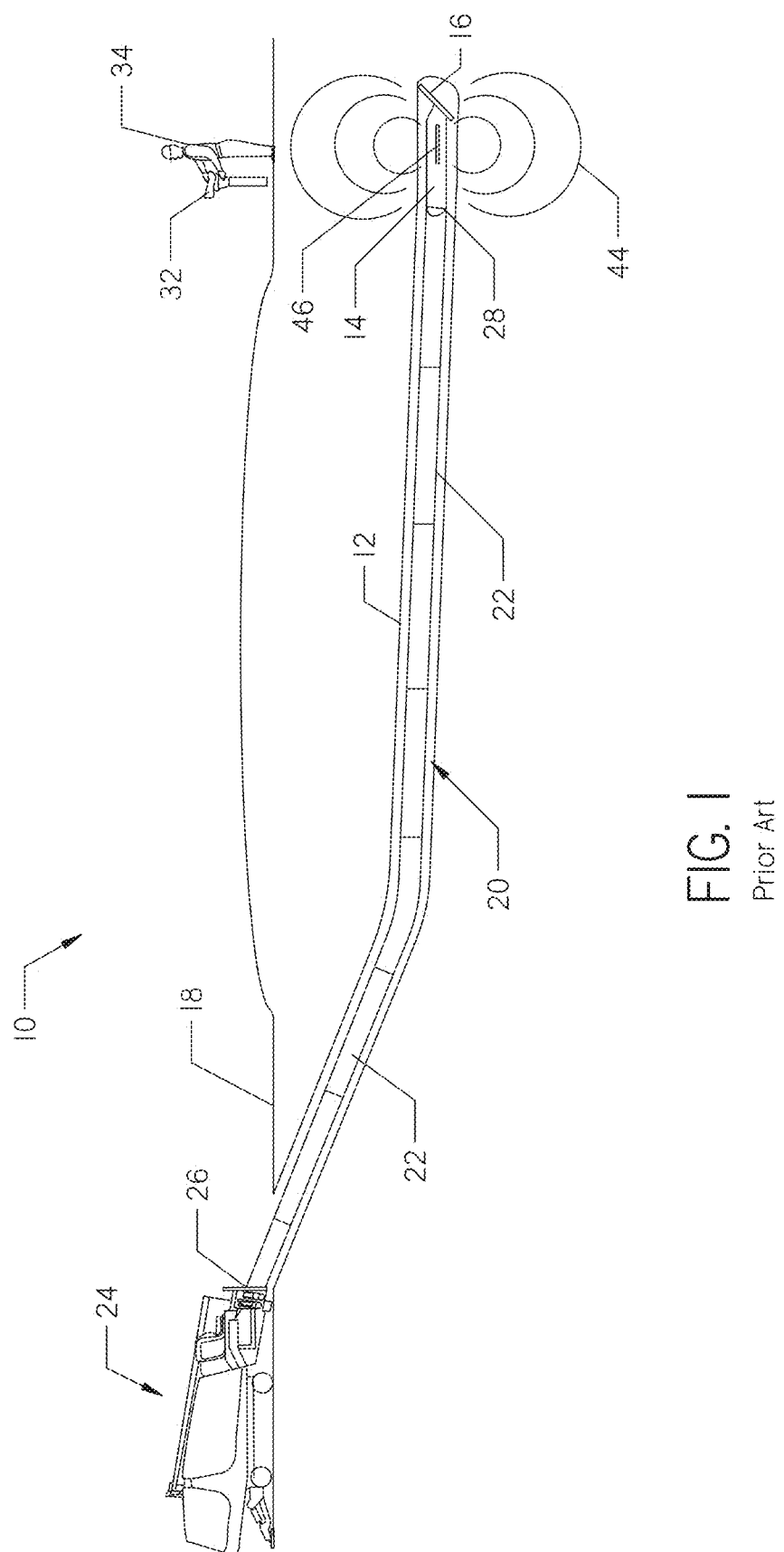
FIG. 1 is an illustration of a horizontal directional drilling operation.
Figure 2:
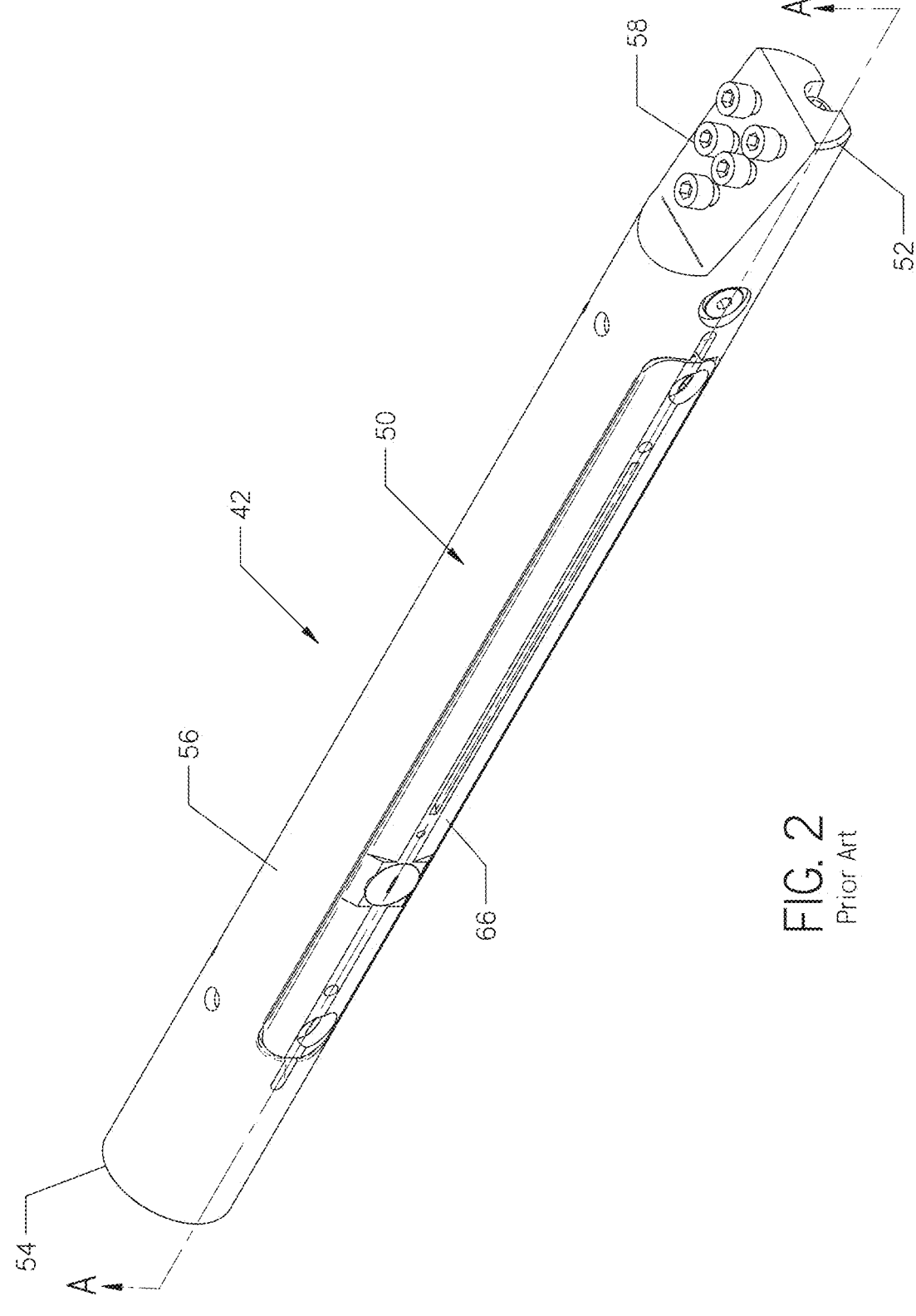
FIG. 2 is a side perspective view of one embodiment of a downhole tool.
Figure 3:
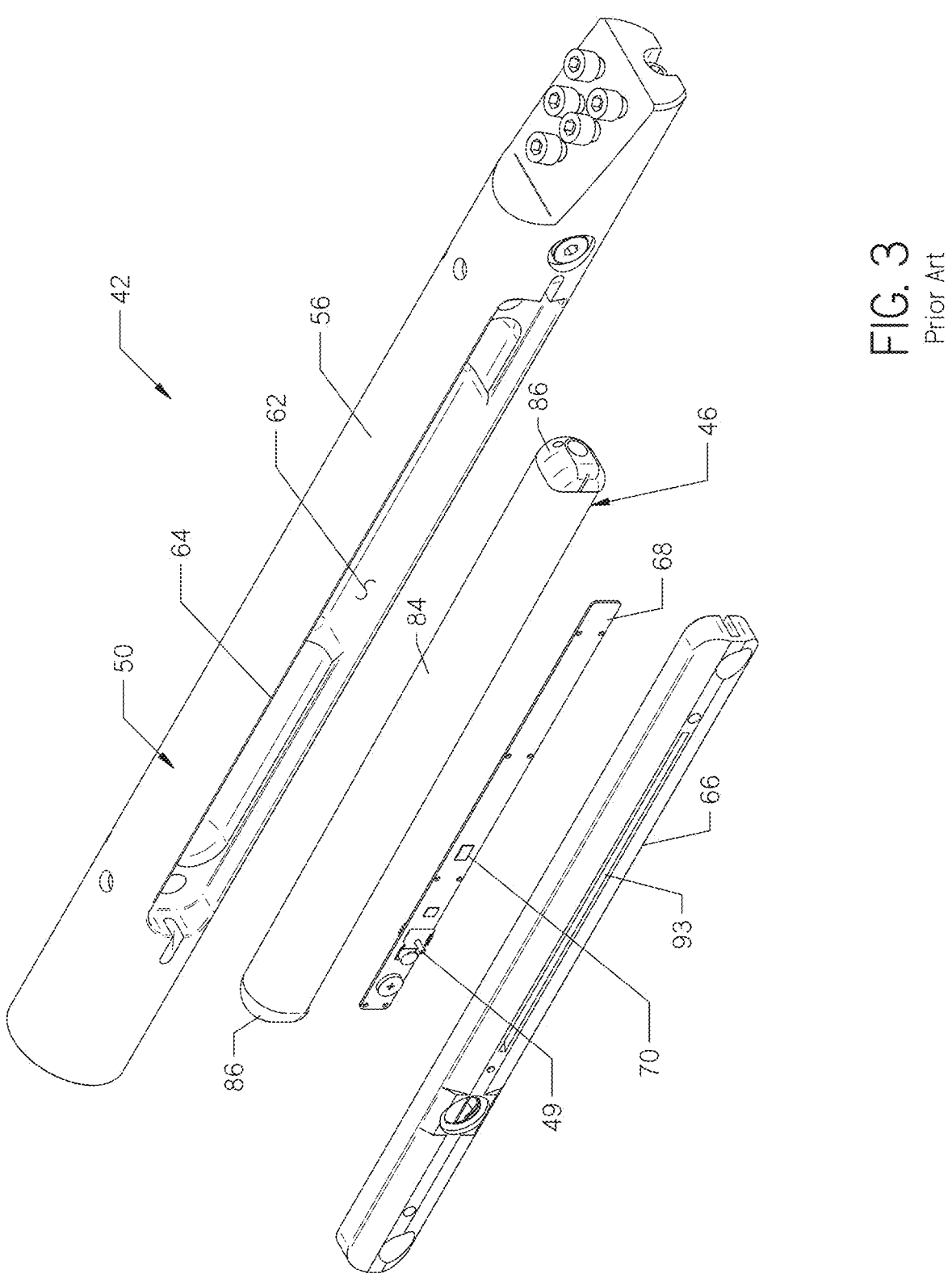
FIG. 3 is a side perspective and exploded view of the downhole tool shown in FIG. 2.
Figure 4:
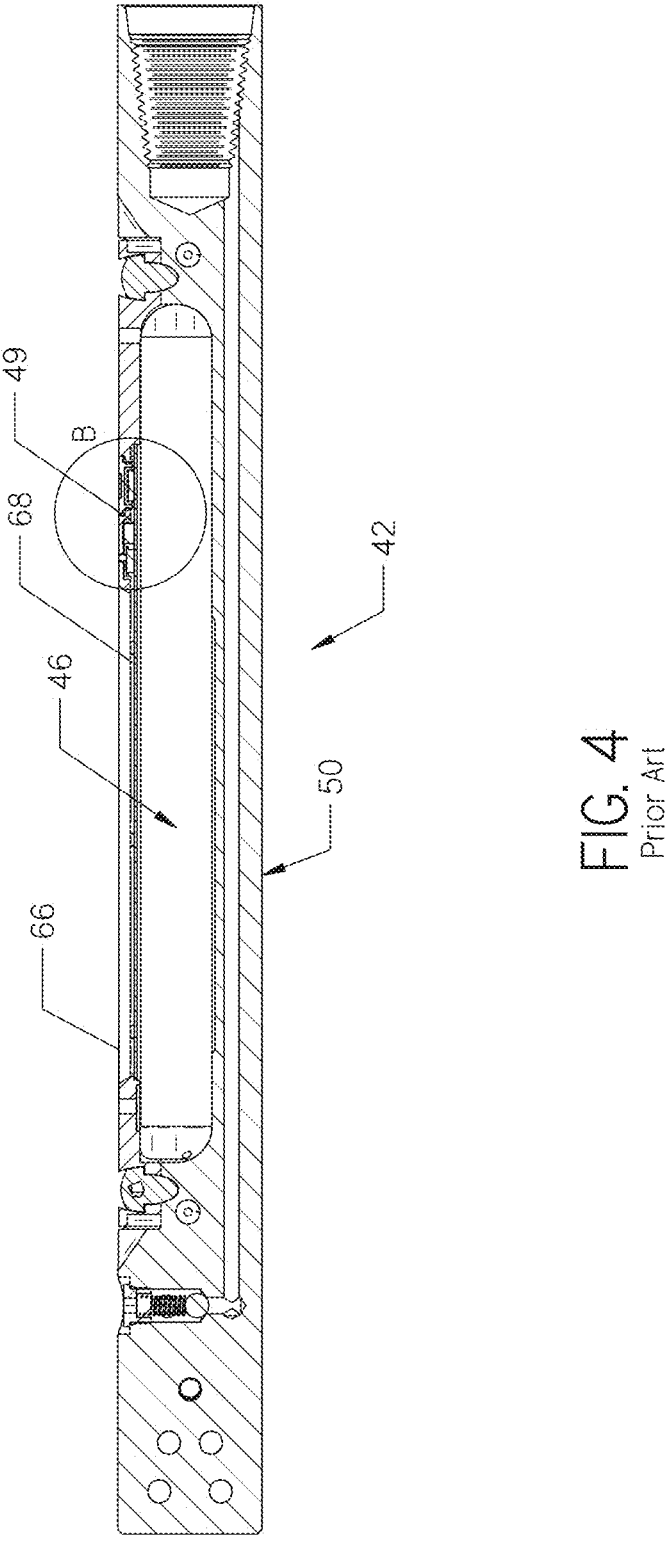
FIG. 4 is a cross-sectional view of the downhole tool shown in FIG. 2, taken along line A-A. The beacon installed within the downhole tool is not shown in cross-section.
Figure 5:
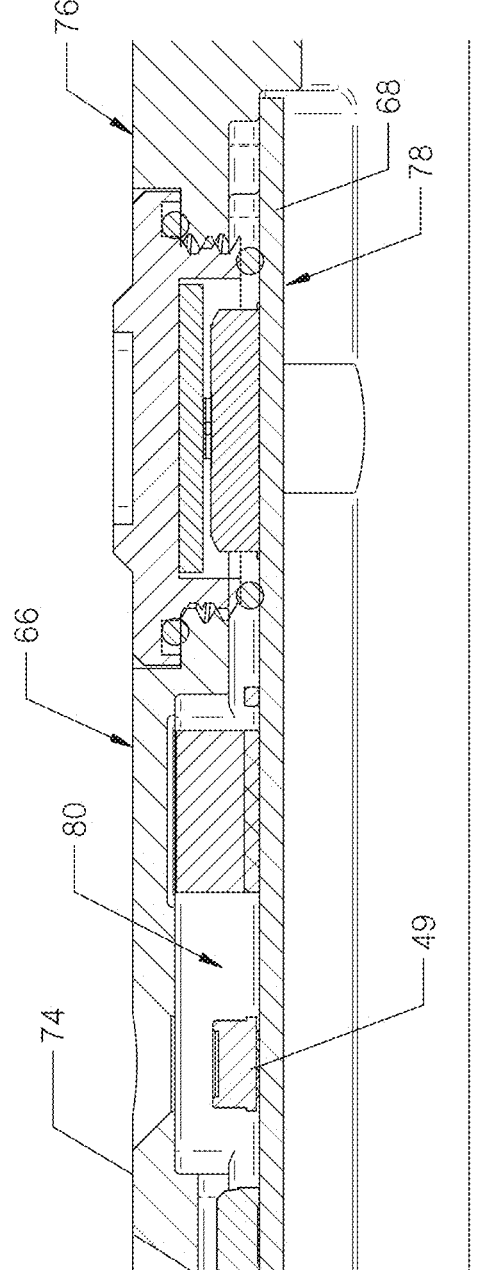
FIG. 5 is an enlarged view of area B shown in FIG. 4.
Figure 6:
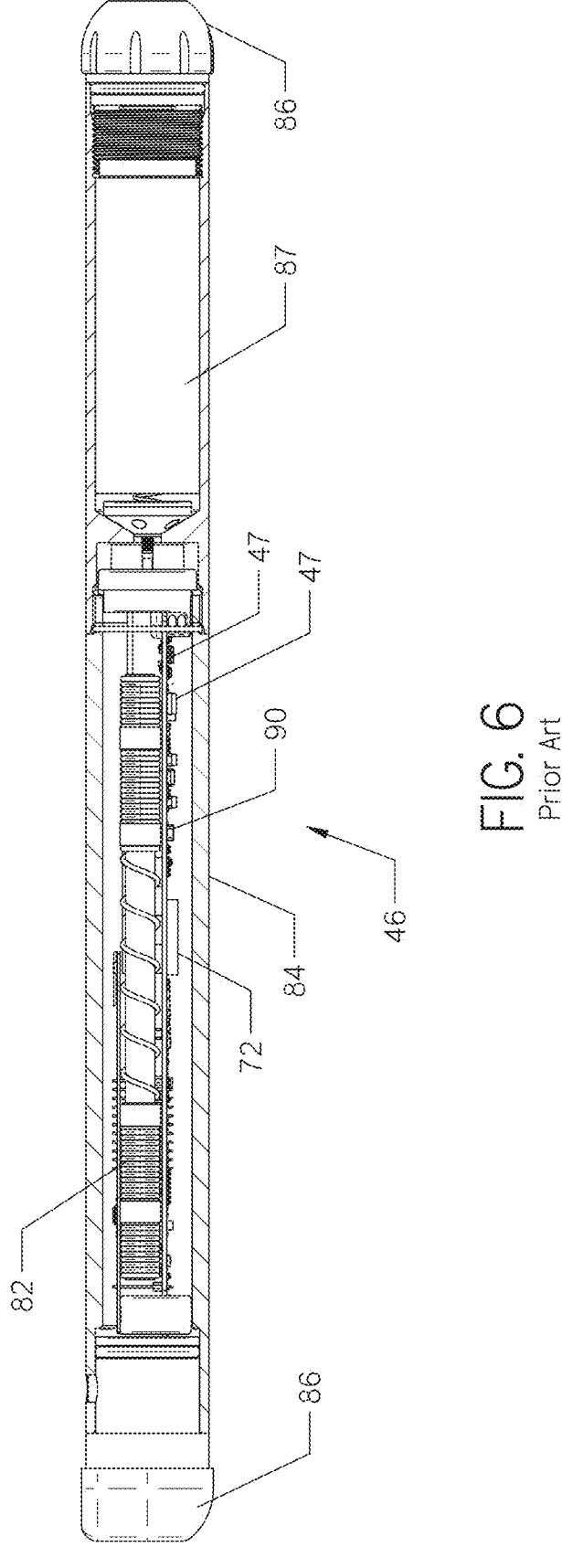
FIG. 6 is a cross-sectional view of the beacon shown in FIGS. 3 and 4, taken along a longitudinal axis of the beacon.

The arrangement of the tension link 300 allows for ease of operation and use. In operation, the beacon 320 may be used in a pilot boring system, such as that shown in FIGS. 1-3. In FIGS. 1-3, the beacon is given reference number 46. Beacon 46 and beacon 320 may be the same beacon. When a pilot bore is finished, and the downhole tool 16 exits a borehole 12 the bit is removed from the drill string. Typically, a backreamer is attached to the drill string to enlarge the borehole.

The tension link 300 may be attached to the backreamer at one end 303 at the connection point 302. A product pipe may be attached to the other end 304 at a connection point 302. The beacon 46 is removed from the cavity 62 (FIG. 3) and placed within a beacon pocket 313 within the cylindrical enclosure 310.

The drill string is then "pulled back" towards the drill, enlarging the borehole 12 with the backreamer. The beacon 46/320 transmits information from the tension link 300 to the tracker 32. Because the beacon 320 has a receiver, it may detect a Bluetooth signal from Bluetooth radio 70, disposed with the electronics package 306. This Bluetooth signal is generated with power from a power source, which may be a battery, or conversely, a supercapacitor 108, charged by harvesting antennas 102, 104 using the beacon signal itself. The signal containing tension information is transmitted by the Bluetooth radio 70, either continuously or intermittently.

The beacon 320, with its higher power and higher capacity battery 322, encodes the beacon information onto its higher power electromagnetic field for detection by the tracker 32.

Figure 15:
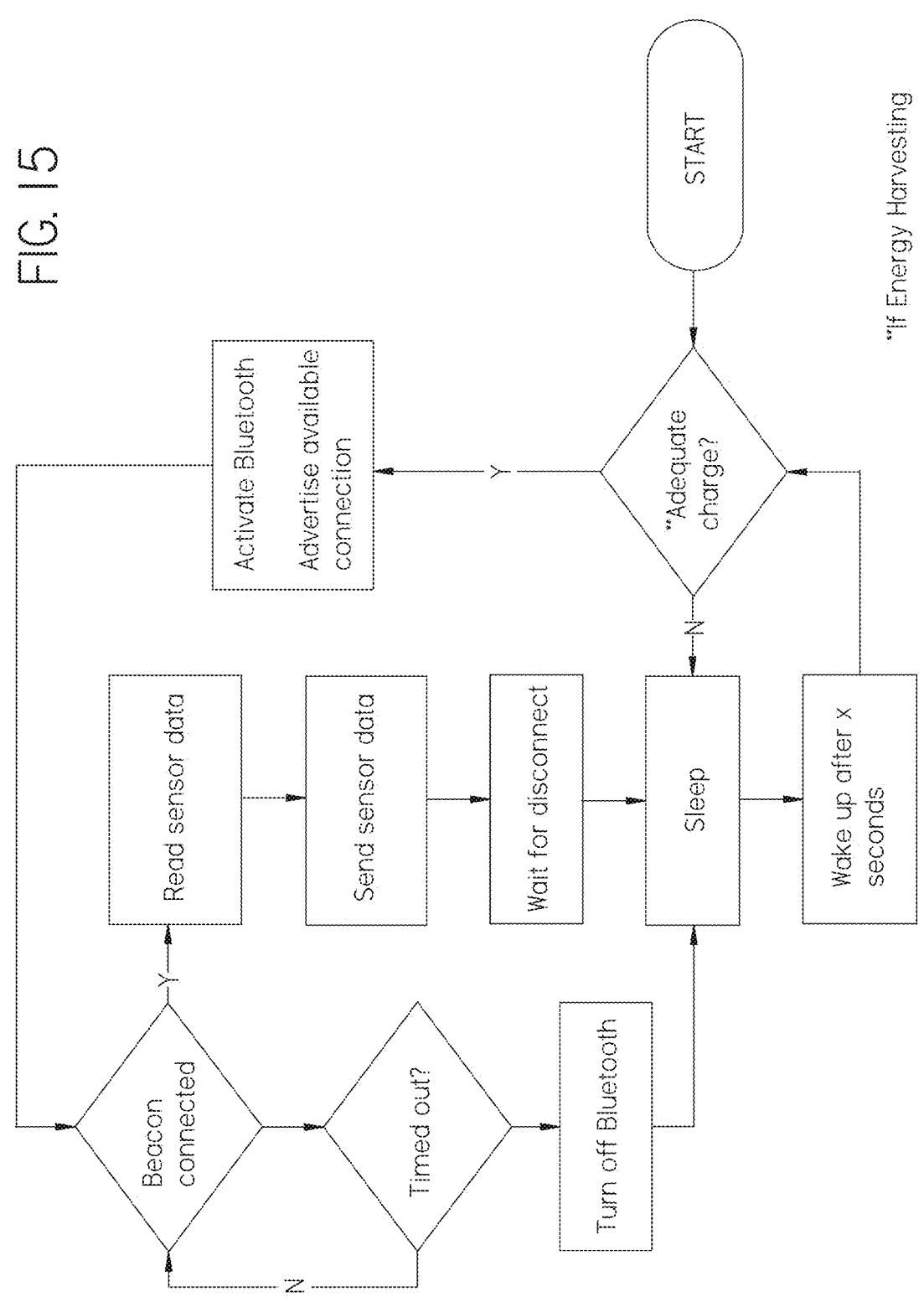
FIG. 15 is a flow chart showing logic of tension monitor electronics. The flow chart includes an optional logic step wherein the system determines if an adequate charge has been generated by an energy harvesting antenna. In applications without a harvesting antenna, a battery or other power source provides a charge, and Bluetooth remains active.

Controller logic for the electronics 106, especially in a low-power environment with use of energy harvesting antennas 102, 104 is shown in FIG. 15. When adequate charge is present in the supercapacitor 108, the Bluetooth radio is activated. The Bluetooth radio 70 checks to see if the beacon 320 is connected. If not, the electronics 106 are placed into a sleep mode, the Bluetooth radio 70 is deactivated, and may wake after a set number of seconds. If the beacon 320 is connected, strain gauge data is read and sent to the beacon 320. To conserve energy, the electronics 106 may be placed in a sleep mode to wake after a set number of seconds.

Energy Harvesting Antenna Systems

Figure 7:
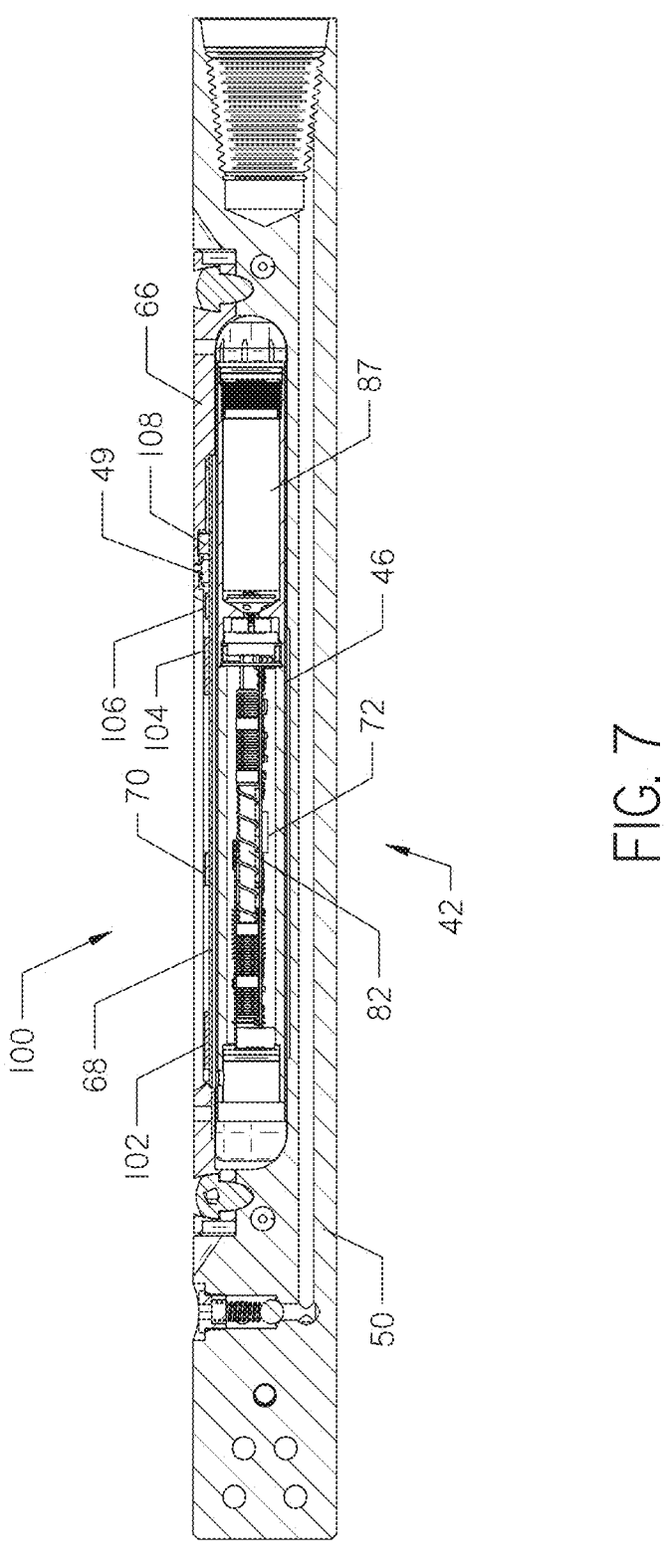
FIG. 7 is the cross-sectional view of the downhole tool shown in FIG. 4, but one embodiment of a downhole energy harvesting system is shown installed within the downhole tool and the beacon is shown in cross-section.
Figure 8:
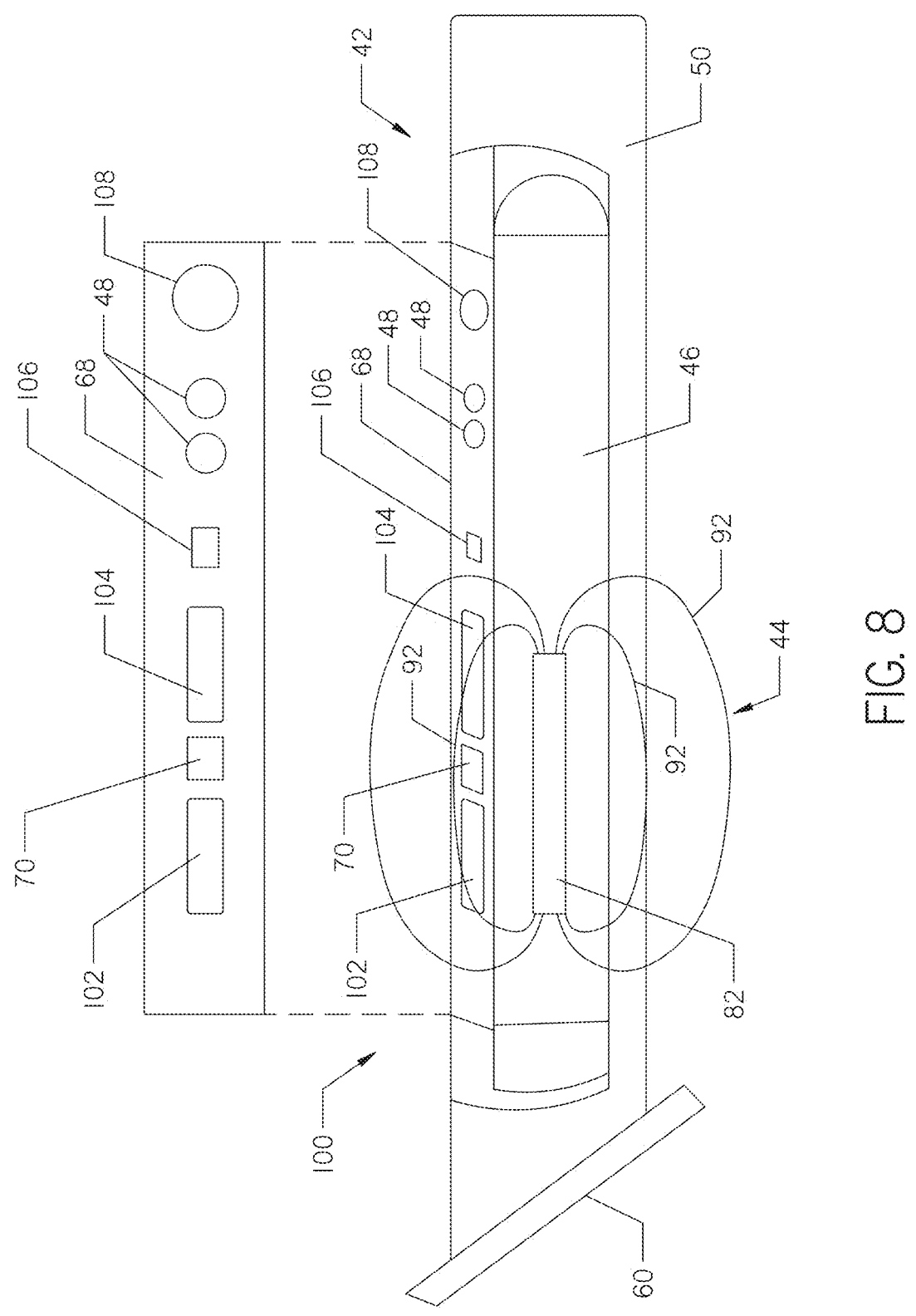
FIG. 8 is a simplified drawing of a perspective and cross-sectional view of the downhole tool and installed downhole energy harvesting system shown in FIG. 7, but the lid has been removed from the downhole tool and the circuit board is shown in a perspective and top plan view. A drill bit is also shown attached to the downhole tool.
Figure 9:
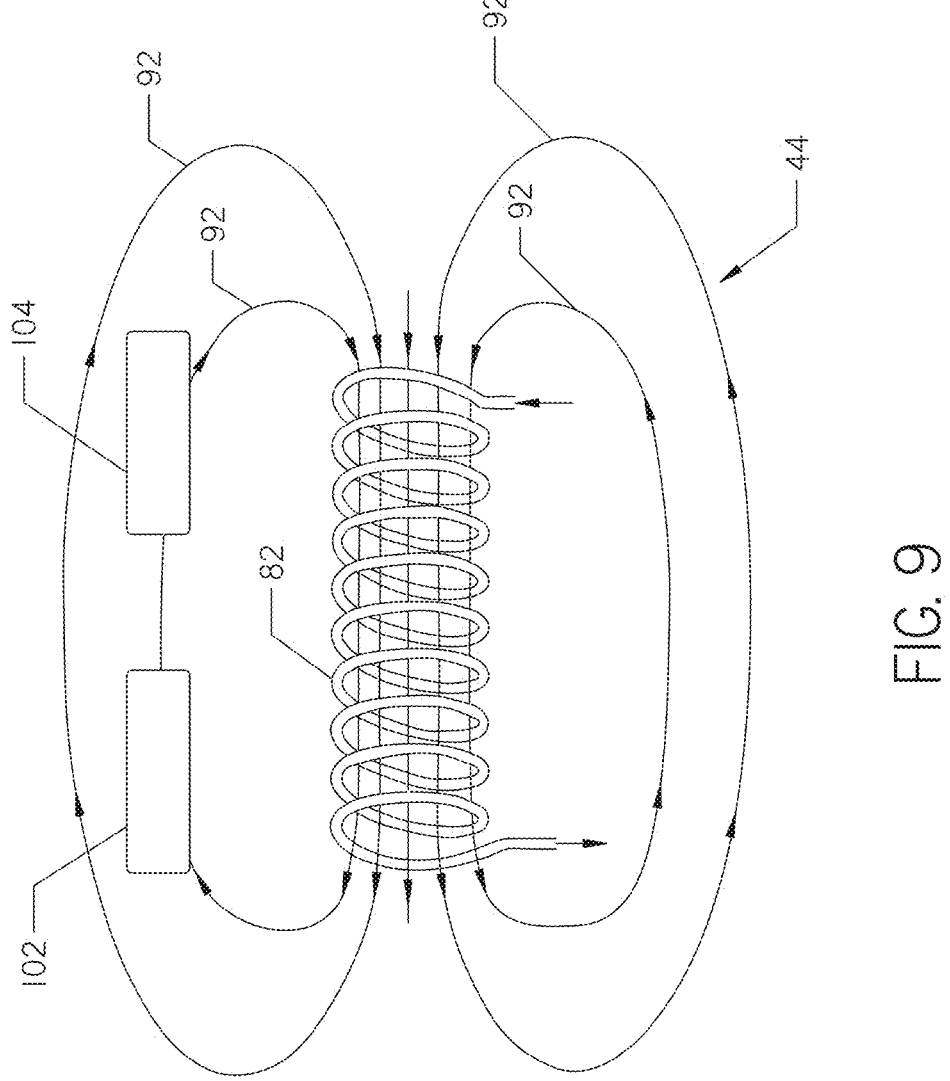
FIG. 9 is a diagram of the interaction between the transmitting antenna and harvesting antennas shown in FIGS. 7 and 8 during operation.
Figure 10:
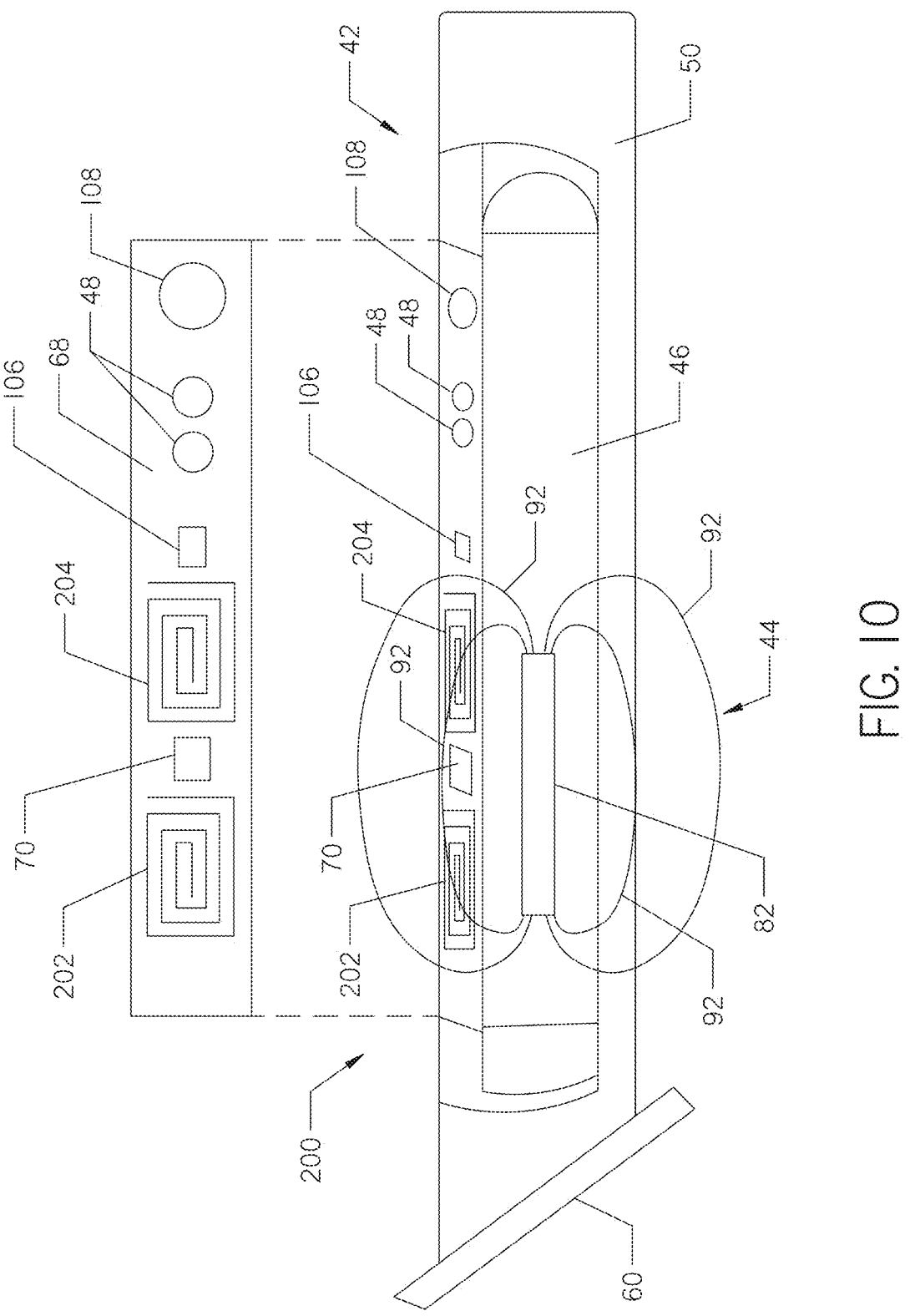
FIG. 10 is the simplified drawing of a perspective and cross-sectional view of the downhole tool shown in FIG. 8, but another embodiment of a downhole energy harvesting system is shown installed therein.
Figure 11:
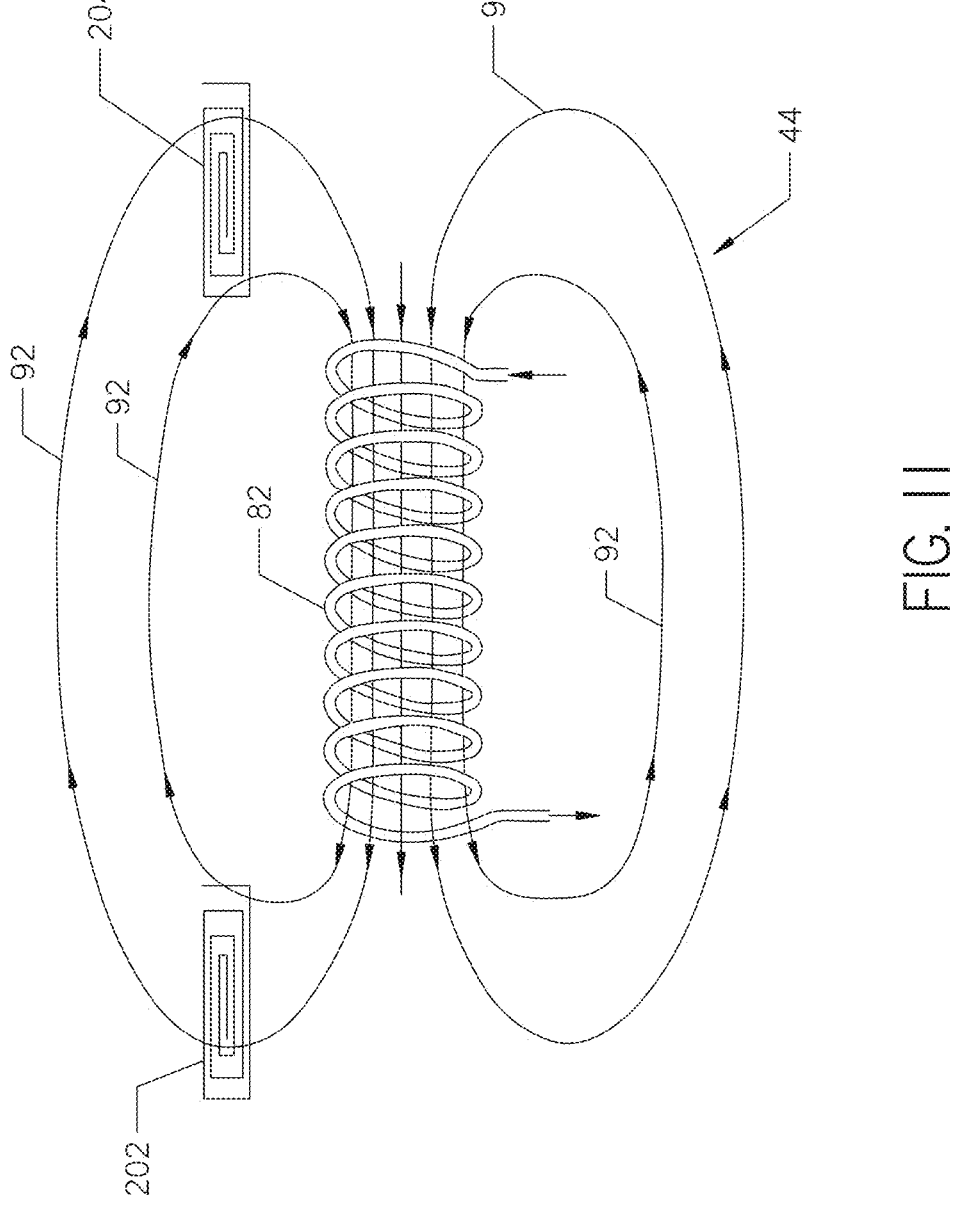
FIG. 11 is a diagram of the interaction between the transmitting antenna and harvesting antennas shown in FIG. 10 during operation.

With reference to FIGS. 7-11, the present application discloses various embodiments of downhole energy harvesting systems which may be used with the tension link 300. One embodiment of a downhole energy harvesting system 100 is shown in FIGS. 7-9. Another embodiment of a downhole energy harvesting system 200 is shown in FIGS. 10 and 11. The systems 100 and 200 are each configured to be installed within a downhole tool, such as the embodiment of a downhole tool 42 shown in FIGS. 2-5, or within the tension link 300 of FIGS. 12-14. As will be described in more detail herein, the systems 100 and 200 are configured to continually harvest power from the beacon signal 44 emanating from the beacon 46, 320.

Turning now to FIGS. 7-9, the downhole energy harvesting system 100 is shown. The system 100 is shown installed within the downhole tool 42 in FIG. 7 and is shown installed within a simplified drawing of the downhole tool 42 with the lid 66 removed in FIG. 8. The same reference numbers will be used in FIG. 8 to designate the same components shown in FIG. 7, for ease of reference. The embodiment shown in FIG. 7 comprises a pressure sensor 49, while the embodiments shown in FIG. 8 comprises two sensors 48. However, in alternative embodiments, only one sensor 48 or more than two sensors 48 may be used. The sensors 48 may comprise any type of sensor known in the art to be used in a downhole tool, such as the previously mentioned pressure sensor, temperature sensor, an accelerometer, an inclinometer, etc. Further, sensor 48 may comprise the electronics 306 of the tension link 300 described in FIGS. 12-14.

The downhole energy harvesting system 100 comprises a first and second harvesting antenna 102 and 104 supported on circuit board 68. The harvesting antennas 102 and 104 may be situated in an intermediate layer 80 of the lid 66. The harvesting antennas 102 and 104 are spaced apart from one another and each positioned near an end of the transmitting antenna 82 such that each antenna 102 and 104 is situated within a pathway of the emitted magnetic or beacon signal 44.

Alternatively, the harvesting antennas 102 and 104 may be in any advantageous location for receiving the signal from the transmitting antenna 82. In FIGS. 12-14, the harvesting antennas are within the cutout 308 of the link body 301, while the transmitting antenna is offset from the centerline of the tension link 300 within the enclosure 310.

The harvesting antennas 102 and 104 shown in FIGS. 7-9 are each a ferrite rod. The ferrite rods are positioned so that a longitudinal axis of each rod lies parallel to a longitudinal axis of the transmitting antenna 82. In such position, the flux lines 92 emanating from the beacon 46 are also in a parallel relationship with the ferrite rods, as shown in FIG. 9. Such positioning concentrates the beacon signal 44 received by the antennas 102 and 104. In operation, each harvesting antenna 102 and 104 harvests or captures electromagnetic energy from the beacon signal 44 as it emanates out of the beacon 46.

In another embodiment, a single longer ferrite rod may be used in place of the two smaller and spaced-apart ferrite rods making up the harvesting antennas 102 and 104. However, using two smaller ferrite rods frees space for other electronics on the circuit board 68. For example, in FIGS. 7 and 8, the Bluetooth radio 70 is shown positioned between the harvesting antennas 102 and 104.

Continuing with FIGS. 7 and 8, the downhole energy harvesting system 100 further comprises a rectifier circuit 106 and an energy storage device 108 supported on the circuit board 68. Such components may also be positioned within the intermediate layer 80 of the lid 66, or within a tension link cutout 308. The energy storage device 108 may comprise a supercapacitor, battery, or other energy storage device known in the art. Energy harvested by each harvesting antenna 102 and 104 is transmitted to the rectifier circuit 106 where it is converted into usable continuous voltage energy. The converted energy is then transmitted to the energy storage device 108 where it is stored.

Energy stored in the storage device 108 is used to power the sensors 48 or 49 or other electronics, such as the Bluetooth radio 70, supported within the downhole tool 42. The harvesting antennas 102 and 104 may be characterized as being in communication with the energy storage device 108. Such communication is facilitated by the rectifier circuit 106. The energy storage device 108 is further in communication with the sensors 48 or 49 and other electronics.

The harvesting antennas 102 and 104 are configured to harvest power at a plurality of different frequencies within a frequency range, such as anywhere between 12 kHz and 46 kHz, for example. Specifically, the harvesting antennas 102 and 104 are configured to harvest power at the lowest frequency range, usually 12 kHz, but potentially lower. The lowest frequency ranges are the most difficult to harvest. In contrast, the higher the frequency, the easier it is to harvest energy. If the harvesting antennas 102 and 104 can capture energy at the lowest frequency, the antennas 102 and 104, as a matter of course, can capture energy from any frequency there above. Likewise, the harvesting antennas 102 and 104 are configured to harvest energy from the beacon signal 44 at a wide range of power levels. The higher the level of power the beacon signal 44 is transmitted at, the easier it is to harvest.

Configuring the antennas 102 and 104 to respond to a large range of frequencies ensures that energy is harvested from the magnetic signal 44 no matter what frequency the transmitting antenna 82 is tuned to. Some beacons can transmit the beacon signal 44 over a wide range of frequencies, for example, 32 different frequencies. The beacon 46, for example, may be configured to switch frequencies, at the direction of an operator, one or more times during the course of a single boring operation. Likewise, configuring the antennas 102 and 104 to respond to a large range of power levels ensures energy is harvested no matter the power level of beacon signal 44.

In summary, the harvesting antennas 102 and 104 are preferably configured to harvest power even when the transmitting antenna 82 is transmitting at the worst case harvesting scenario, the lowest frequency and low power. Even in this scenario, the harvesting antennas 102 and 104 can harvest enough power to adequately charge the energy storage device 108. However, the higher the frequency and power level, the faster the energy storage device 108 is charged.

During operation, the harvested energy may be stored temporarily in the energy storage device 108 and used only when needed for certain electronics. For example, it takes a lot of energy for the Bluetooth radio 70 to transfer its data to the beacon 46, but the data may not need to be transmitted very often—for example, every second, 10 seconds, or 30 seconds. In such case, the energy storage device 108 may be configured to store energy for 30 seconds before powering the Bluetooth radio 70 long enough to burst the data to the beacon 46. The Bluetooth radio 70 is then powered down between data transmission sessions.

As another example, energy may be harvested until the energy storage device 108 has enough energy to power the sensors 48 or 49, the Bluetooth radio 70, and/or other electronics powered by the energy storage device 108. Once the energy storage device 108 has enough power stored up, it powers the needed electronics and then begins storing energy again. In such embodiment, the energy storage device 108 may not power any electronics for extended periods of time or at non-uniform intervals.

As another example, the energy storage device 108 may be configured to store energy until energy is needed. For example, the Bluetooth radio 70 may be turned off until the system recognizes that the sensors 48 or 49 have measured critical data—for example, a pressure sensor measures a high level of downhole pressure or the tension link 300 measures a high level of stress. Upon measuring the critical data, energy stored within the energy storage device 108 is sent to the Bluetooth radio 70, allowing the radio to transmit the critical data to the beacon 46. In such embodiment, the energy storage device 108 may not power any electronics for extended periods of time, helping to ensure that the energy storage device 108 is charged when power is needed.

Turning now to FIGS. 10 and 11, the downhole energy harvesting system 200 is shown. Like FIG. 8, the system 200 is shown installed within a simplified drawing of the downhole tool 42 in FIG. 10. The system 200 functions in the same manner as the system 100, but the system 200 utilizes another embodiment of harvesting antennas 202 and 204. Like the antennas 102 and 104, the antennas 202 and 204 are situated within a pathway of the emitted magnetic or beacon signal 44.

Instead of ferrite rods, the harvesting antennas 202 and 204 are PCB trace antennas supported on the circuit board 68. The harvesting antennas 202 and 204 may be placed within the intermediate layer 80 of the lid 66, or may be placed within the tension link cutout 308. The harvesting antennas 202 and 204 are spaced apart from one another and each positioned near an end of the transmitting antenna 82. Each harvesting antenna 202 and 204 is positioned so that the flux lines 92 intersect a longitudinal axis of each antenna 202 and 204 at a relatively perpendicular or non-zero angle, as shown in FIG. 11. Such positioning concentrates the beacon signal 44 received by the antennas 202 and 204.

In other embodiments, the harvesting antenna or antennas may comprise hand wound magnet wire or other types of antennas known in the art. The chosen system may be configured to store energy and power the electronics using any number of time intervals or methods, including those not specifically described herein.

If desirable, the harvesting antenna or antennas may also be configured to harvest power from a magnetic field at a single frequency, rather than a range of frequencies. This embodiment may be desirable if the beacon only emits a single frequency throughout the course of the boring operation. In such case, only a single one of the harvesting antennas 102, 104, 202, or 204 disclosed herein may be needed to harvest an adequate amount of energy from the magnetic signal.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A method of assembling a downhole tool, the downhole tool comprising:
a housing;
a tension monitor disposed within the housing and comprising:
a link, extending from a first end to a second end, each of the first and second end having a connection point;
a tension monitoring sensor disposed proximate the link, wherein the tension monitoring sensor is configured to generate a tension signal indicative of a tension within the link;
a power source; and
a first transmitter, connected to the power source and configured to send the tension signal;
a beacon disposed within the housing and comprising:
a receiver, configured to receive the tension signal and generate tension data; and
a second transmitter, configured to transmit a beacon signal to an uphole location, wherein the tension data is encoded on the beacon signal;
the method comprising:
drilling a pilot borehole with a drill bit to an exit point, the drill bit having the beacon in a beacon housing;
at the exit point, removing the beacon from the beacon housing; and
placing the beacon into the housing.

2. The method of claim 1, further comprising:
after placing the beacon into the housing, attaching the first end of the link to a backreamer;
attaching the second end of the link to a product pipe;
thereafter, pulling the product pipe through the pilot borehole with the backreamer;
with the tension monitor, sending the tension signal to the beacon;
emitting the beacon signal from the beacon, with the tension data encoded on the beacon signal; and
detecting the beacon signal at an above ground tracker.

3. The method of claim 1, further comprising:
at the tension monitor, harvesting power from the beacon signal using at least one energy harvesting antenna; and
using the power to send the tension signal.

4. A downhole tool, comprising:
a housing, the housing having a first cavity, offset from a centerline of the housing, and a second cavity, the second cavity extending longitudinally through the housing along a centerline of the housing;
a tension link, disposed within the second cavity, the tension link comprising:
a tension sensor configured to detect tension data;
a power source; and
a first transmitter, powered by the power source and configured to transmit the tension data; and
a beacon, disposed within the first cavity, the beacon comprising:
a receiver, configured to receive the tension data from the first transmitter; and
a second transmitter, configured to emit a magnetic field signal, wherein the tension data is encoded on the magnetic field signal.

5. The downhole tool of claim 4 wherein the tension link further comprises:
a power harvesting antenna, configured to generate power in the presence of the magnetic field signal, wherein the power harvesting antenna powers the power source.

6. The downhole tool of claim 4, wherein the first transmitter comprises a Bluetooth radio.

7. The downhole tool of claim 4 wherein the tension sensor comprises a strain gauge.

8. The downhole tool of claim 4 in which the first cavity and the second cavity do not intersect.

9. A kit, comprising:
a housing, the housing having:
a first cavity, offset from a centerline of the housing and opening at an outer periphery of the housing;
a second cavity, the second cavity extending longitudinally through the housing along a centerline of the housing, wherein the first cavity and the second cavity do not intersect; and
a lid, covering the first cavity; and
a tension link, disposed within the second cavity, the tension link comprising:
a tension sensor configured to detect tension data;
a power source; and
a first transmitter, powered by the power source and configured to transmit the tension data;
wherein the first cavity is configured to house a beacon antenna.

10. The kit of claim 9 further comprising the beacon antenna, the beacon antenna being disposed in the first cavity.

11. The kit of claim 9 in which the tension link further comprises an energy harvesting antenna, configured to charge the power source when in the presence of a magnetic field.

* * * * *